(12) United States Patent
de Hoog et al.

(10) Patent No.: US 11,522,387 B2
(45) Date of Patent: Dec. 6, 2022

(54) VIRTUALIZATION OF LARGE-SCALE ENERGY STORAGE

(71) Applicant: International Business Machines Corporation, Armonk, NY (US)

(72) Inventors: Julian de Hoog, Greensborough (AU); Arun Vishwanath, Blackburn (AU); Timothy M. Lynar, Dickson (AU)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 16/672,615

(22) Filed: Nov. 4, 2019

(65) Prior Publication Data
US 2020/0067316 A1 Feb. 27, 2020

Related U.S. Application Data

(63) Continuation of application No. 15/845,377, filed on Dec. 18, 2017, now Pat. No. 10,554,046.

(51) Int. Cl.
*G06Q 50/06* (2012.01)
*H02J 13/00* (2006.01)
(Continued)

(52) U.S. Cl.
CPC ........ *H02J 13/00017* (2020.01); *G06Q 50/06* (2013.01); *H02J 3/32* (2013.01);
(Continued)

(58) Field of Classification Search
CPC ...... H02J 13/00004; H02J 13/38; H02J 3/381; H02J 3/32; G06Q 50/06
See application file for complete search history.

(56) References Cited

U.S. PATENT DOCUMENTS

| 5,274,571 A | 12/1993 | Hesse et al. |
| 9,300,141 B2 | 3/2016 | Marhoefer |

(Continued)

FOREIGN PATENT DOCUMENTS

| EP | 2822140 A1 * | 1/2015 | ............ G06F 1/263 |
| WO | WO-2016084347 A1 * | 6/2016 | ............ G06Q 50/06 |

OTHER PUBLICATIONS

Robins, B., "New power generation: Home battery sharing could build virtual public utilities", The Sydney Morning Herald, home/business section, http://www.smh.com.au/business/new-power-generation-home-battery-sharing-could-build-virtual-public-utilities-20170416-gvlvnr.html, Apr. 23, 2017, Accessed on Oct. 4, 2017, 6 pages.

(Continued)

*Primary Examiner* — Vincent H Tran
(74) *Attorney, Agent, or Firm* — Scully, Scott, Murphy & Presser, P.C.; Joseph Petrokaitis

(57) ABSTRACT

A hardware processor may be coupled to a communication network and receive charging requests and discharging requests from a plurality of prosumer facilities via the communication network. One or more energy storage systems may be coupled to an energy grid and able to charge from and discharge to the energy grid, and may communicate with the hardware processor via the communication network. Based on the charging requests and discharging requests, an energy schedule may be generated. The energy schedule may include a first set of the prosumer facilities from which charge requests are accepted, and a second set of prosumer facilities from which discharge requests are accepted. One or several energy storage systems may be controlled or triggered to charge or discharge repeatedly via the energy grid according to an updated energy schedule (e.g., regularly updated).

19 Claims, 12 Drawing Sheets

(51) Int. Cl.
*H02J 3/32* (2006.01)
*H02J 3/38* (2006.01)
*H02J 7/00* (2006.01)

(52) U.S. Cl.
CPC .............. *H02J 3/38* (2013.01); *H02J 3/381* (2013.01); *H02J 7/007188* (2020.01); *H02J 13/00004* (2020.01); *H02J 13/00007* (2020.01); *H02J 7/0025* (2020.01); *H02J 2300/24* (2020.01)

(56) References Cited

U.S. PATENT DOCUMENTS

| | | | | |
|---|---|---|---|---|
| 10,554,046 | B2* | 2/2020 | de Hoog | H02J 3/383 |
| 10,847,973 | B2* | 11/2020 | Berger | H02J 3/381 |
| 2008/0046387 | A1* | 2/2008 | Gopal | G01D 4/004 705/412 |
| 2008/0269953 | A1* | 10/2008 | Steels | H04L 12/10 700/295 |
| 2009/0006226 | A1* | 1/2009 | Crowder | G06Q 40/12 705/30 |
| 2010/0017045 | A1 | 1/2010 | Nesler et al. | |
| 2010/0306097 | A1* | 12/2010 | Greiner | H02J 13/0006 705/37 |
| 2011/0055036 | A1* | 3/2011 | Helfan | G06Q 50/06 705/26.1 |
| 2012/0130556 | A1 | 5/2012 | Marhoefer | |
| 2012/0286574 | A1 | 11/2012 | Sawada et al. | |
| 2013/0103557 | A1* | 4/2013 | Larocque | H02J 3/14 705/34 |
| 2013/0166081 | A1* | 6/2013 | Sanders | G05B 15/02 700/286 |
| 2013/0198023 | A1* | 8/2013 | El Khayat | G06Q 30/06 705/26.1 |
| 2013/0257384 | A1 | 10/2013 | Nishibayashi et al. | |
| 2014/0021783 | A1* | 1/2014 | Belschn | H02J 1/14 307/18 |
| 2014/0114441 | A1* | 4/2014 | Kawai | H02J 3/14 700/22 |
| 2014/0184156 | A1 | 7/2014 | Sutardja | |
| 2014/0279361 | A1* | 9/2014 | Streeter | G06Q 50/06 705/37 |
| 2014/0351010 | A1 | 11/2014 | Kong | |
| 2015/0149249 | A1* | 5/2015 | Mansfield | G06Q 50/06 705/7.31 |
| 2015/0214776 | A1* | 7/2015 | Ukita | H02J 3/008 307/24 |
| 2015/0266391 | A1* | 9/2015 | Hostyn | G01C 21/362 701/423 |
| 2015/0280437 | A1 | 10/2015 | Carlson et al. | |
| 2016/0190822 | A1 | 6/2016 | Lee et al. | |
| 2016/0196621 | A1* | 7/2016 | Tokunaga | G06Q 10/06 705/7.25 |
| 2016/0254671 | A1 | 9/2016 | Cutright et al. | |
| 2016/0363948 | A1 | 12/2016 | Steven et al. | |
| 2017/0025894 | A1 | 1/2017 | Sanders et al. | |
| 2017/0070089 | A1 | 3/2017 | Fukubayashi et al. | |
| 2017/0109841 | A1 | 4/2017 | Sadikovic | |
| 2017/0205865 | A1* | 7/2017 | Hwang | G06Q 50/06 |
| 2017/0206614 | A1* | 7/2017 | Hwang | G06Q 40/04 |
| 2017/0207633 | A1* | 7/2017 | Nakayama | H02J 3/382 |
| 2017/0207639 | A1 | 7/2017 | Christfort | |
| 2017/0243290 | A1* | 8/2017 | Brown | G06Q 30/0202 |
| 2017/0300019 | A1 | 10/2017 | Blackhall et al. | |
| 2018/0011507 | A1* | 1/2018 | Schwarz | H02J 13/00022 |
| 2019/0001833 | A1 | 1/2019 | Coburn et al. | |
| 2019/0181642 | A1* | 6/2019 | Cowen, III | H02J 3/32 |
| 2020/0311830 | A1* | 10/2020 | Crampe | G06Q 50/06 |

OTHER PUBLICATIONS

Randazzo, R., "Utilities experiment with big batteries in Phoenix to tackle one of solar's major problems", azcentral, part of the USA Today network, http://www.azcentral.com/story/money/business/energy/2017/04/20/power-grid-utilities-big-batteries-metro-phoenix-solar-srp-aps/100349564/, Apr. 20, 2017, Accessed on Oct. 4, 2017, 4 pages.

Giuntoli, M., et al., "Optimized Thermal and Electrical Scheduling of a Large Scale Virtual Power Plant in the Presence of Energy Storages", IEEE Transactions on Smart Grid, Jun. 2013, pp. 942-955, vol. 4, No. 2.

Asmus, P., "Microgrids, Virtual Power Plants and Our Distributed Energy Future", The Electricity Journal, Dec. 2010, pp. 72-82, vol. 23, Issue 10.

Tan, A, "Pareto Optimal Operation of Distributed Battery Energy Storage Systems for Energy Arbitrage under Dynamic Pricing", IEEE Transactions on Parallel and Distributed Systems, Jul. 2016, pp. 2103-2115, vol. 27, No. 7.

Cheng, M., et al., "Benefits of using virtual energy storage system for power system frequency response", Applied Energy (2017), Received Mar. 31, 2016, Available online Jul. 6, 2016, pp. 376-385, vol. 194.

Roofegari Nejad, R., et al., "Smart virtual energy storage control strategy to cope with uncertainties and increase renewable energy penetration" Journal of Energy Storage (2016), Received Jun. 20, 2015, Available online Mar. 19, 2016, pp. 80-94, vol. 6.

"AGL launches world's largest solar virtual power plant battery demonstration to benefit customers", AGL, ASX and Media Releases, Aug. 5, 2016, 2 pages.

Roozbehani, M., et al., "A Layered Architecture for Enabling Virtual Energy Storage in Power Distribution Grids", Kuwait-MIT Center for Natural Resources and the Environment, https://cnre.mit.edu/research/layered-architecture-enabling-virtual-energy-storage-power-distribution-grids. Accessed on Dec. 17, 2017, 1 page.

Walton, R., "PG&E, SolarCity partner for solar+storage, grid services pilot", https://www.utilitydive.com/news/pge-solarcity-partner-for-solarstorage-grid-services-pilot/422484/, Jul. 13, 2016, Accessed on Dec. 17, 2017, 2 pages.

List of IBM Patents or Patent Applications Treated as Related, dated Nov. 4, 2019, 2 pages.

* cited by examiner

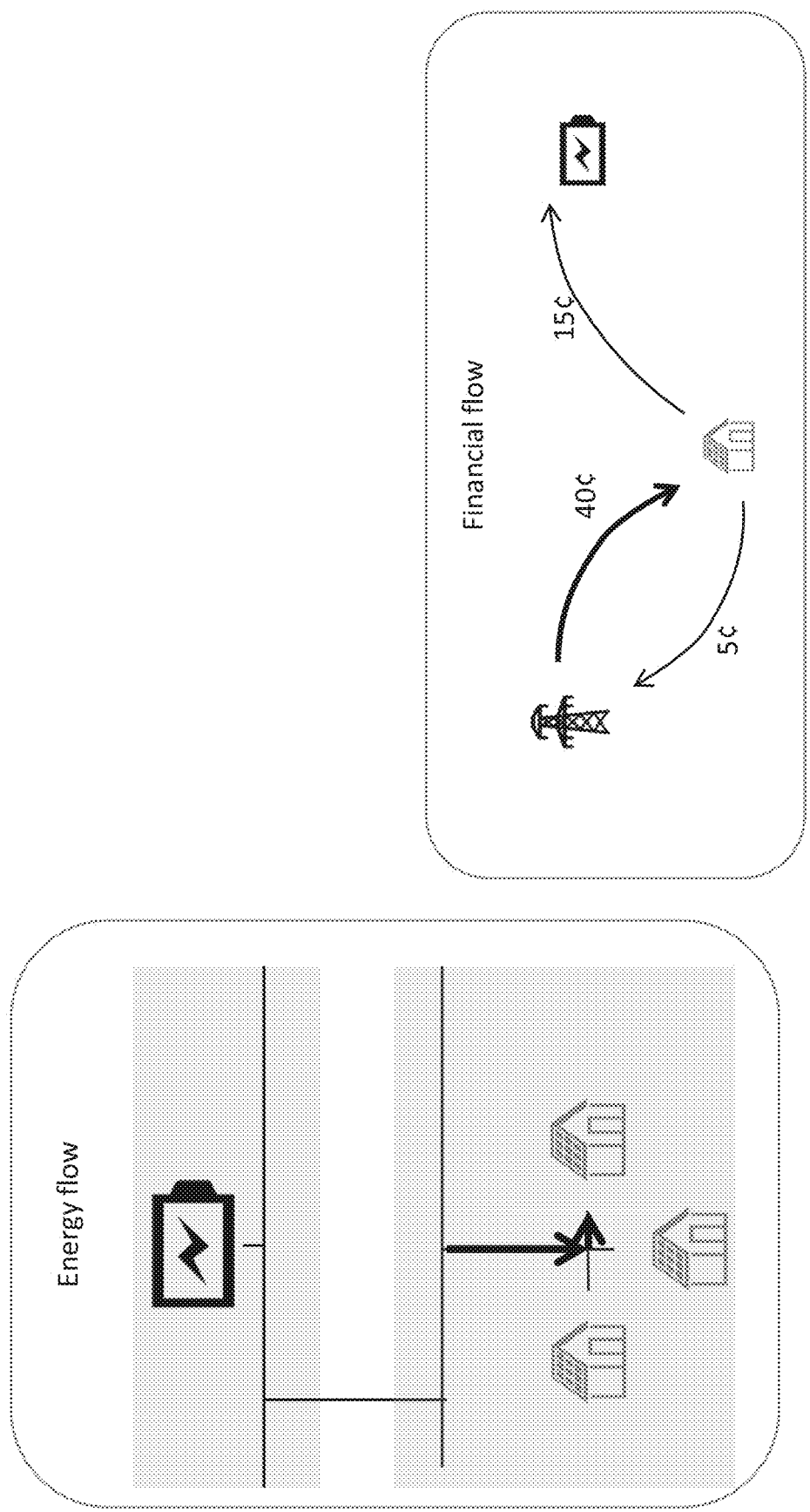

VIRTUALIZATION OF LARGE-SCALE ENERGY STORAGE

FIELD

The present application relates to energy sources such as batteries and to controlling charging and discharging of the energy sources in an energy or power grid in a distributed manner.

BACKGROUND

In many parts of the world, energy customers (including small scale residential customers) are beginning to produce energy locally. This has led to the term "prosumer"— customers who may both consume and produce energy. In many cases, the local energy generation comes from solar photovoltaic (PV) cells that convert sunlight to electricity. Such systems are becoming more and more affordable, and in some cases are very widespread. However, often the solar (or other) energy generation is uncontrollable and unpredictable, and may not occur at the same time as the local energy demand. For example, residential homes often have peak demand in the evening, when the sun is no longer shining. As a result there is now an increasing demand for energy storage, which allows energy generated locally during the day to be stored, so that it can then be used when it is needed later. However, energy storage is expensive and sometimes bulky, and may not be suitable for certain homes.

BRIEF SUMMARY

An energy storage and distribution system and method may be provided. The system, in one aspect, may include a hardware processor. A communication interface may be coupled to the hardware processor and operable to connect the hardware processor to a communication network. The hardware processor may be operable to receive via the communication interface charging requests and discharging requests from a plurality of prosumer facilities. One or more energy storage systems coupled to an energy grid may be able to charge from and discharge to the energy grid. The energy storage systems may be further coupled to the hardware processor via the communication network. Based on the charging requests and discharging requests, the hardware processor may be operable to generate an energy schedule comprising a first set of the prosumer facilities from which to accept charge requests and store energy in the energy storage systems, and a second set of prosumer facilities from which to accept discharge requests, and discharge energy from the energy storage systems. The first set of the prosumer facilities and the second set of prosumer facilities may be selected from the plurality of prosumer facilities. The hardware processor may be further operable to control the energy storage systems to charge or discharge according to the energy schedule A method of charging and discharging energy storage, in one aspect, may include receiving via a communication network, charging requests and discharging requests from a plurality of prosumer facilities. The method may also include, based on the charging requests and discharging requests, generating an energy schedule comprising a first set of the prosumer facilities from which to accept charging requests, and a second set of prosumers from which to accept discharging requests, the first set of the prosumer facilities and the second set of prosumer facilities selected from the plurality of prosumer facilities. The method may further include controlling one or more energy storage systems to charge or discharge according to the energy schedule, the energy storage systems coupled to an energy grid, wherein energy is charged and discharged via the energy grid.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIGS. 2A-2H illustrate an example application of a virtual energy storage system in one embodiment.

DETAILED DESCRIPTION

More and more energy consumers are starting to generate their own electricity locally, for example via solar photovoltaic panels on house rooftops or via wind turbines. Such consumers are often referred to as "prosumers", since they both consume and produce electricity. For many prosumers the mismatch in timing between their energy production and generation leads to a need to time shifting of energy, in other words storing energy when it is generated so that it may be used at a later time when it is needed. Energy storage is often expensive. A system, method and techniques are provided for an on demand virtual energy storage to meet energy production and consumption needs for prosumers. In one aspect, a common shared energy resource may be provided via electrical networks in a distributed manner, allowing for ways of sharing and using "virtual" energy storage solutions, that makes the benefits of energy storage available to a wide set of potential users while reducing any storage-related costs. The system, method and techniques may additionally provide for grid stability in energy or power grids, for example, electrical grids.

Figure 1:
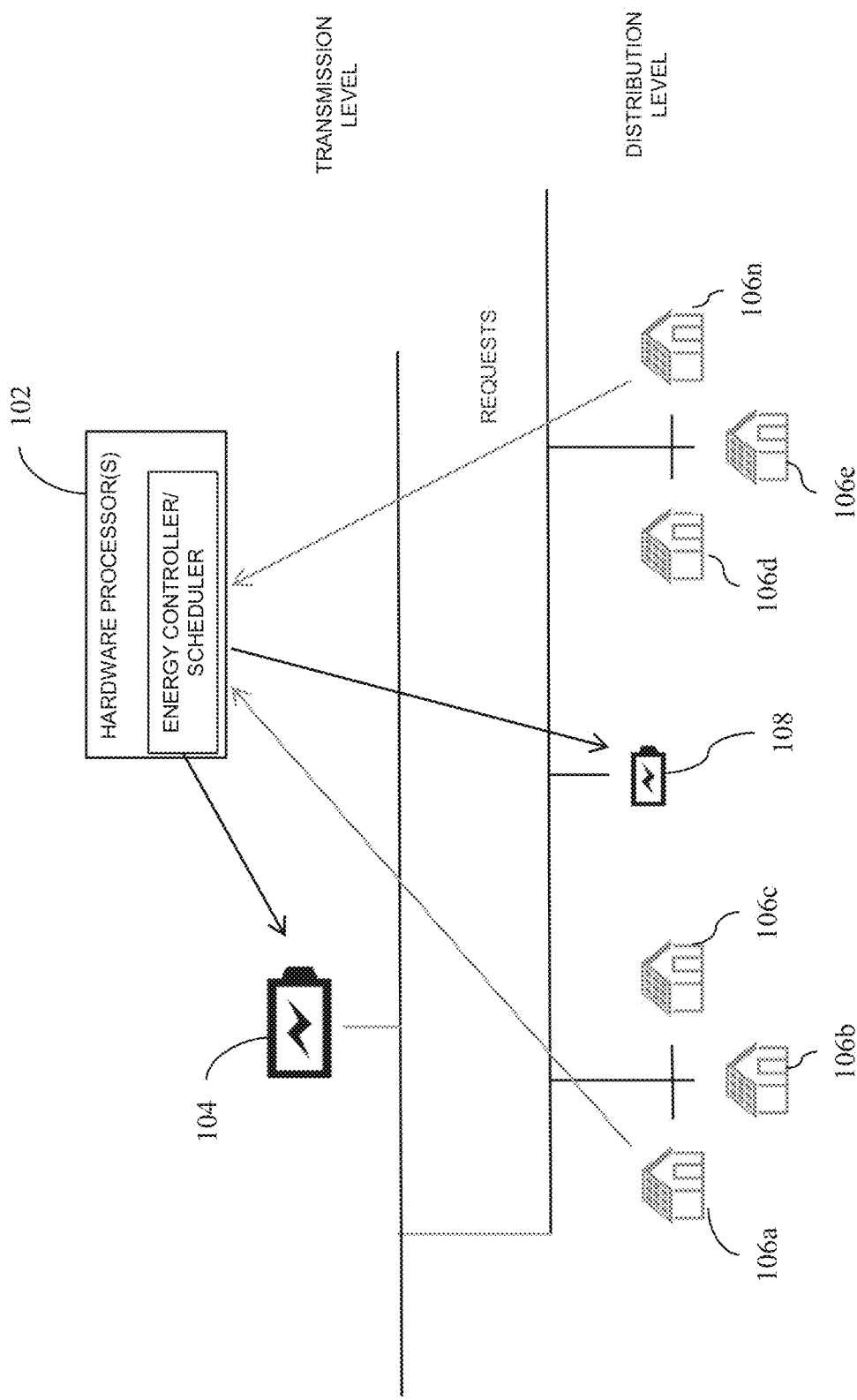
FIG. 1 is a diagram illustrating an overview of a virtual energy storage system in one embodiment.

FIG. 1 is a diagram illustrating an overview of a virtual energy storage system in one embodiment. The virtual energy storage may optimally schedule charging and discharging in response to the requirements of distributed users, in a manner that maintains network stability. Such optimization may also provide shared economic benefit. A system in one embodiment of the present disclosure, may allow for optimally scheduling charging and discharging of large-scale energy storage or grid energy storage, for instance, in response to the requirements of distributed users, in a manner that maintains network stability and provides shared economic benefit. In some embodiments, individual prosumers may purchase distributed, virtual energy storage. In some embodiments, multiple prosumers may use distributed, virtual energy storage to trade energy. In some embodiments, an optimal central scheduler with a charge controller 102 controls charge and/or discharge requests, charge state, and buy and sell transactions. In some embodiments, one or more centralized batteries (or another energy storage device) may be connected to a power grid, for example, the electric utility grid, which connects to a plurality of prosumers 106*a-n* (module or device). A centralized battery may be located at different levels within the grid, for example 108 on the same feeder as the prosumers, or 104 on a parent feeder that connects multiple distribution networks, or without loss of generality at any level in the hierarchy of the electric utility grid. Thus, more than one (multiple) centralized batteries may exist in the grid, for example, as shown at 104 and 108. The energy or power grid may include any energy or power distribution network or system for distributing power to power users or prosumers. Each prosumer facility (e.g., computer and energy generator) 106*a-n* may include a communication module, power sensing and logging components with ability to communicate with the energy controller and scheduler 102, including sending charge and/or discharge requests. The power sensing and logging components may additionally have a forecasting functionality, allowing them to determine in advance the anticipated energy generation and demand of the prosumer facility. The energy controller and scheduler 102 may receive requests from one or more prosumer facilities 106*a-n*. The energy controller and scheduler 102 may use an understanding of the battery performance and degradation characteristics, as well as historical time series data regarding marginal profit and impact of operation on battery, to determine an optimal schedule for charging and/or discharging, and control the energy storage device or devices, e.g., 104, 108, to charge (store energy) or discharge (transfer or output) energy. In one aspect, the energy storage system of the present disclosure is referred to as a virtual storage. For example, the energy storage system need not be actually located on the premises of the user that is discharging energy to and/or charging energy from (e.g., selling and/or buying). The quantities of energy being stored need not match the real energy being stored. For example, if two user premises simultaneously buy and sell 5 kWh of energy, then no action needs to be taken by the battery, but to the user premises it still appears as if 5 kWh went into and came out of storage.

Figure 2B:
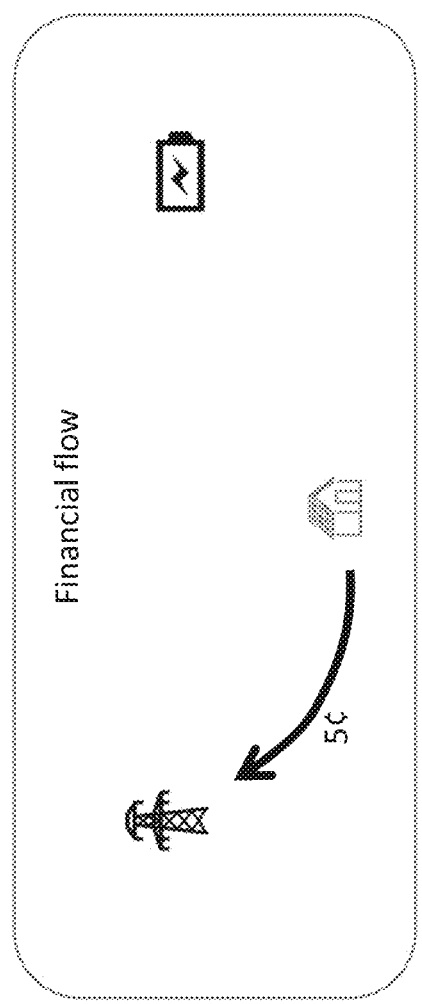
Figure 2A:
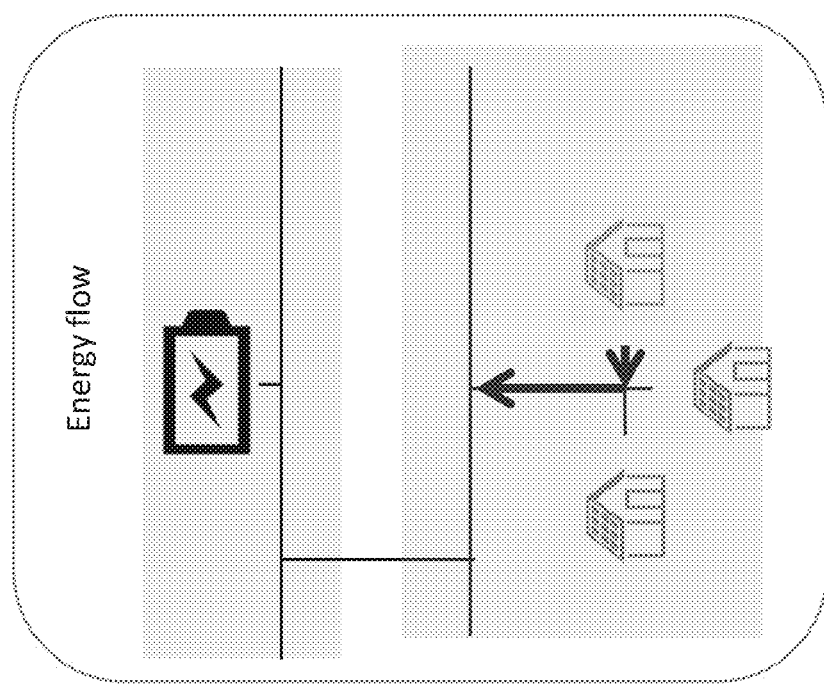
Figure 2C:
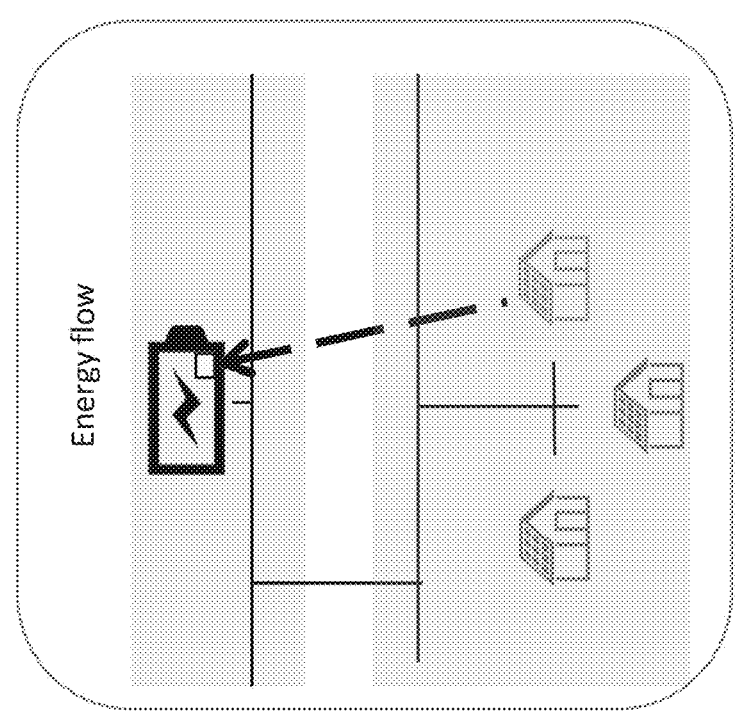
Figure 2D:
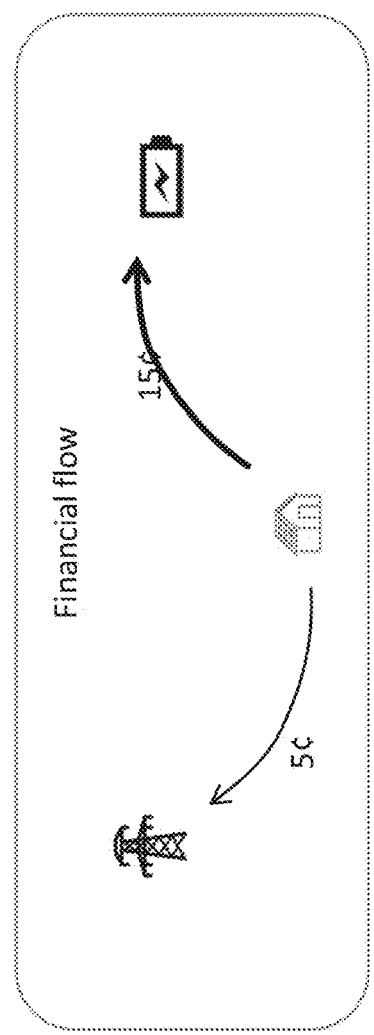
Figure 2H:
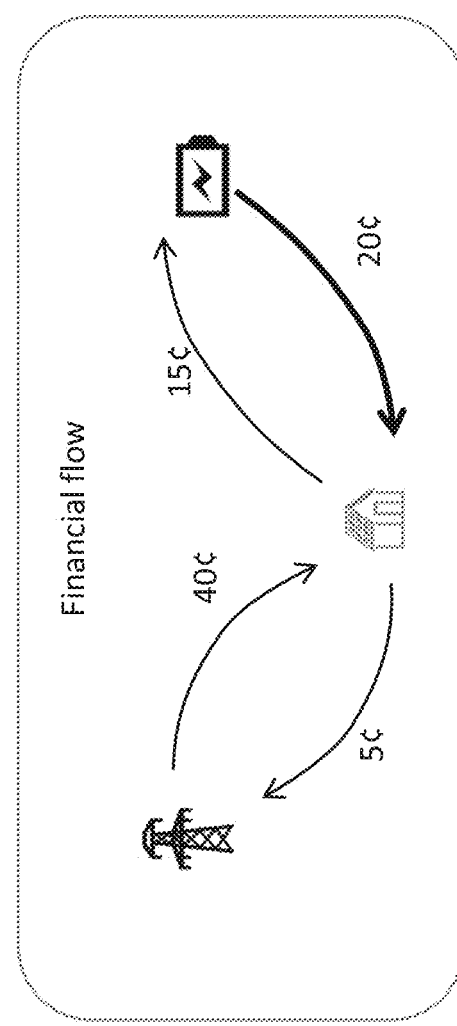
Figure 2G:
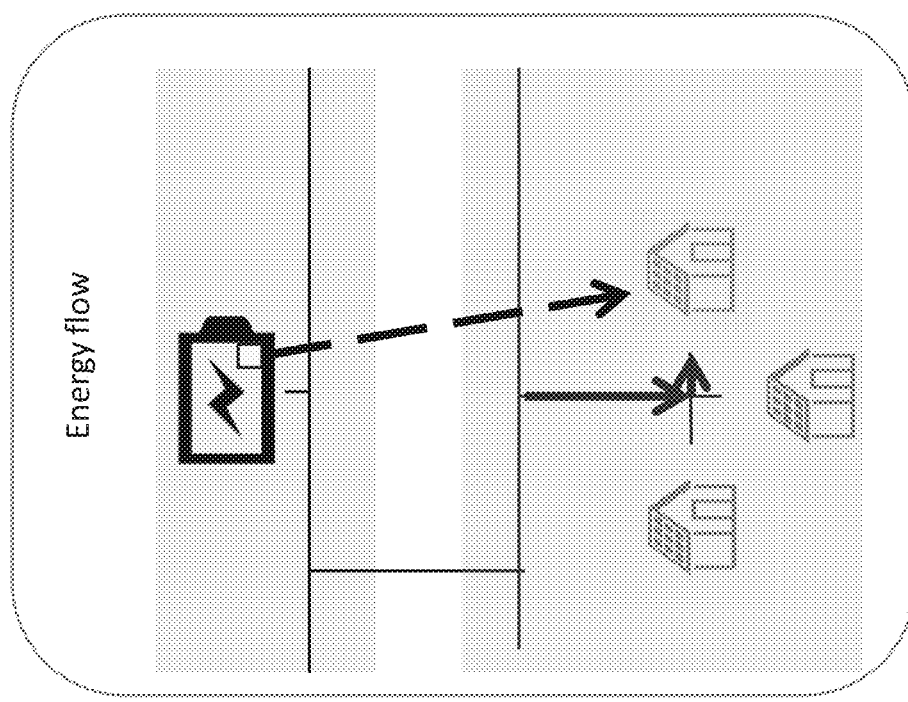

FIGS. 2A-2H illustrate an example application of a virtual energy storage system in one embodiment. While the drawings illustrate prosumer facilities as houses, prosumer facilities may include other buildings such as commercial buildings, educational buildings, and others, and are not limited to houses only. In the middle of the day, House A has a high level of solar generation, but does not receive much from its retailer or utility for exporting to grid (e.g., 5¢ for exporting energy). FIG. 2A shows an energy flow from a house to a grid in this example. FIG. 2B shows a financial flow in the same example. FIGS. 2C and 2D show that House A is better off selling its energy to a virtual storage operation (e.g., a third party operator), for example, at 15¢ (a better rate than provided, e.g., by the retailer or utility). Energy is stored in the energy storage device. As shown in FIGS. 2E and 2F, in the evening, House A has high electricity demand, and would have to pay, e.g., the retailer or utility a high price for it (e.g., 40¢ for importing energy). But instead, it can cash in its virtual energy storage (from, e.g., the third party operator), at a much lower cost, e.g., 20¢, as shown at FIGS. 2G and 2H. There is significant benefit in selling to and buying from the virtual energy storage, and this also reduces any burden imposed on the utility, e.g., of having to distribute energy at times of high demand. In one aspect, there is no change to the fixed network connection cost, which remains the same. The above example scenario benefits prosumers, energy storage operators, and grid providers, for example, by providing a cost effective and grid stabilizing approach. For instance, prosumers may pay less for energy than they would otherwise; virtual energy storage operators can sell additionally available energy to, e.g., commercial buildings or to the energy market during the day time to help offset the peaks experienced by commercial customers; if peak demand is reduced then utilities do not have to fire up costly peaking plants, with energy from the energy storage meeting some of the peak demand.

Figure 3A:
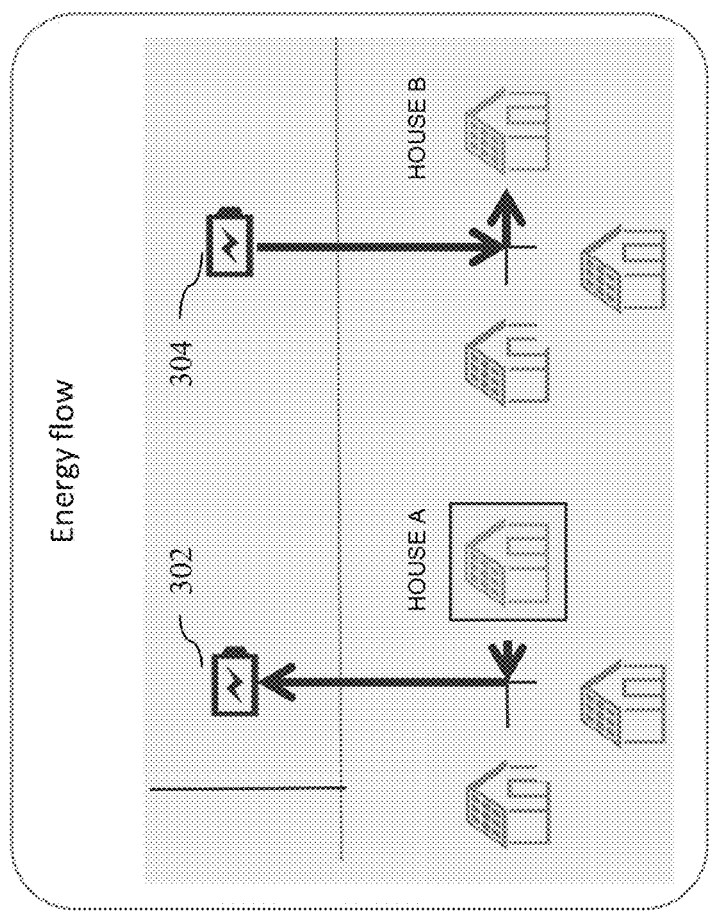
FIGS. 3A-3B illustrate another example application of a virtual energy storage system in one embodiment.
Figure 3B:
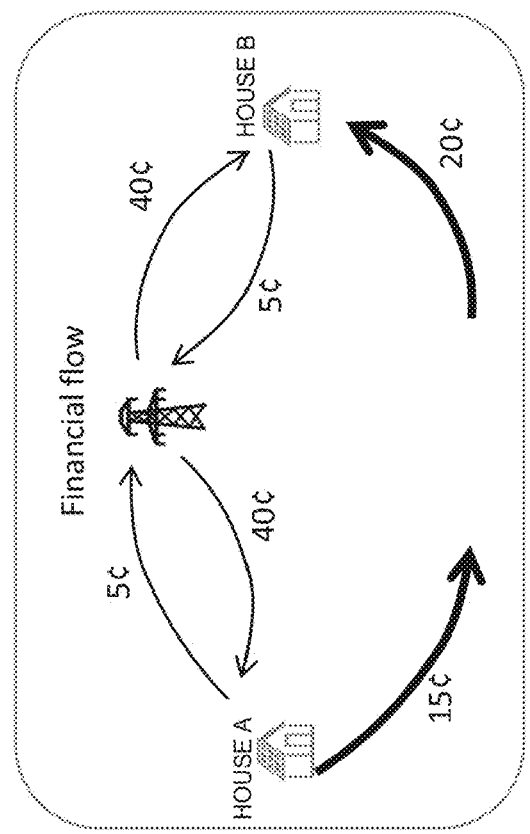

FIGS. 3A-3B illustrate another example application of a virtual energy storage system in one embodiment. House A has a high level of solar generation, but does not receive much benefit for exporting to grid (e.g., House A may receive 5¢ for exporting energy). House B has low level of solar generation (or high electricity demand) and must pay a high price (e.g., 40¢) for importing energy. Houses A and B exchange the required energy at rates favorable to each, via a virtual energy storage system composed of real physical energy storage devices 302, 304. For instance, battery 302 charges and battery 304 discharges. The effect is as if houses A and B are selling directly to one another, but due to the presence of two batteries local to each, houses A and B can generate and consume energy to and from one another even if they are a long distance apart, for example, even if they are in different states. The storage system (e.g., battery) operator may provide this service by charging a nominal fee or the difference between charge and discharge cost. In practice, the network constraints may be handled by an optimal distributed storage management system. Storage 302 that is physically located close to house A charges, while storage 304 that is physically located close to B discharges. As described above, there may exist more than one centralized storage systems local to a group of premises (e.g., consumers and/or producers). A group of consumers and/or producers may be served by a local (centralized) energy storage system. A local energy storage system (e.g., 302, 304) may serve multiple different consumers and/or producers at the same time. As an example, a premise may be served by a local energy storage system that is physically located closest to the premise. However, physical distance need not be the only criteria for determining the local energy storage system serving a premise. Rather, which local energy storage system serves which group of premises may be configurable, for instance, based on one or more criteria, and need not be hard fixed. This use case may also apply, for example, to building energy management. For instance, a building energy management may include managing energy supply and/or demand at multiple sites, and shifting energy virtually from one building to another, for example, and avoid peak charges or cost. These buildings may, for example, be located at great distance from one another.

Figure 4:
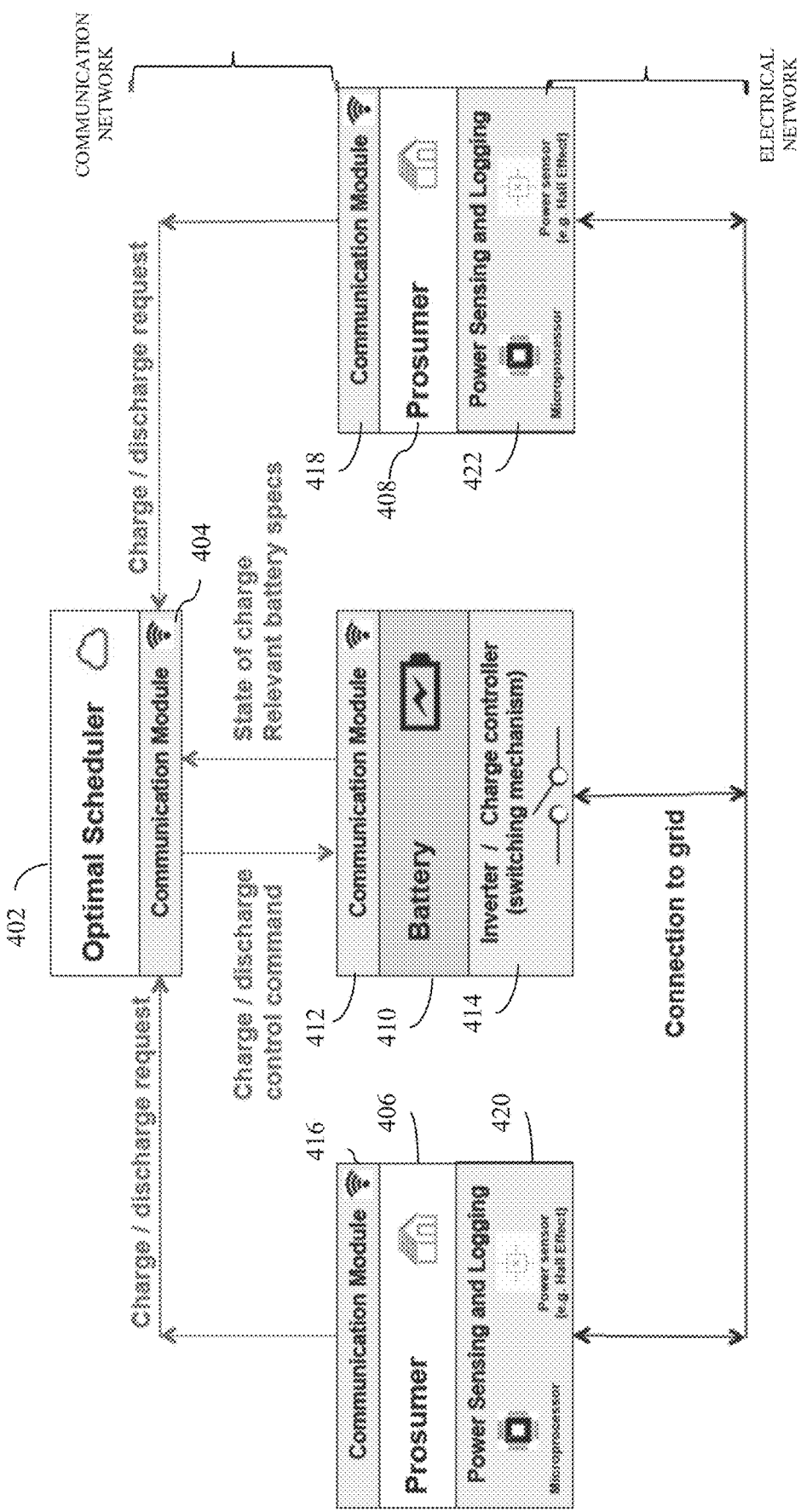
FIG. 4 is a diagram illustrating component overview of a virtual energy storage system in one embodiment.

FIG. 4 is a diagram illustrating component overview of a virtual energy storage system in one embodiment. A computer or processing component or system may include an energy scheduler component 402 that may execute on a hardware processor. In one embodiment, the energy scheduler component 402 may execute in a cloud-based computer system, and/or in a proprietary computer system. The hardware processor may be coupled with a communication module (e.g., wired and/or wireless) 404, via which the energy scheduler component 402 may receive energy charge and discharge requests from a plurality of prosumers' energy facilities, e.g., 406, 408, and communicate with an energy storage module or device, for example, a battery 410 to trigger to command the battery to discharge or charge energy. The energy storage device 410 is also coupled with a communication module 412 for communicating with the hardware processer executing the energy scheduler component 402. Based on the command received from the hardware processer executing the energy scheduler component 402, the storage device's inverter or charge controller switch may be turned on or off.

For instance, the energy scheduler component 402 may receive a request from prosumer 406 to charge by a certain amount (for example, 5 kWh), causing it to send a command or signal to the energy storage device 410 to start charging. In response the storage device 410 triggers a switch 414 to commence charging the battery with the required amount (5 kWh) from the electrical grid.

The storage device 410 may also send the state of the energy storage device (e.g., state of battery charge) and relevant specification (e.g., battery-specific information), to the energy scheduler component 402, for instance, periodically and automatically, or at the request of the energy scheduler component 402, for instance, via the communication network. The battery-specific information can include, e.g.: parameters related to the battery's performance characteristics; the battery's efficiency; the battery's state-of-health, for example, changes to useable capacity over time; the battery's internal status, for example, status of individual cells, cell balancing, potential failure of any cells.

As another example, the energy scheduler component 402 may receive a request from a prosumer 406 to discharge by a certain amount (for example, 5 kWh), causing it to send a command or signal to the energy storage device 410 to start discharging. In response, the storage device 410 triggers a switch 414 to commence discharging the battery by the required amount (5 kWh) to the electrical grid.

A plurality of prosumer facilities 406, 408 may exist in a grid (e.g., power grid) for connecting to an energy storage device 410, and also in a communication network communicating with the hardware processor executing the energy scheduler component 402. For example, a prosumer facility 406 may include local energy generation capacity, for example, by solar panel cells and associated devices.

Associated with prosumer facility 406 there may be a power sensing and logging module 420, which continually monitors both the energy being generated by prosumer 406 and the energy being consumed by prosumer 406. The power sensing and logging module 420 may log energy generation and demand by prosumer 406 over an extended period of time (e.g., days, weeks, months, or years). The power sensing and logging module 420 may also provide forecasts for the immediate future (such as, e.g., hours or days ahead) for both the expected energy generation and the expected energy demand of the prosumer. These forecasts may be made on the basis of any information available to the power sensing and logging module, including for example: the time series data of prosumer 406 energy generation and demand; the current time of day, day of week, week of year; any available weather information; any available satellite data (to forecast solar irradiation and cloud cover); any available sky-facing camera information (to forecast cloud cover); any locally relevant information, for example, local shading due to trees, chimneys, and/or other structures. Forecasting algorithms or models such as a regression model and other machine learning models may be employed for making forecasts.

Prosumer facility 406 also may include a communication module 416 coupled with a hardware processor allowing the prosumer facility 406 to communicate with the energy scheduler component 402. The prosumer facility 406, for example, may send a charge or discharge request to the energy scheduler 402 for charging the energy storage device 410. The charge or discharge request may be made on the basis of the forecasts provided by the power sensing and logging module 420. The forecasts of energy consumption and energy production at the prosumer facility 406 for example, may be made autonomously, for example, at that facility.

Similarly, the prosumer facility at 408 may include a communication module 418 for communicating with the energy scheduler 402, and a power sensing and logging device 422. The power sensing and logging device 422 may perform the same sensing, logging, and forecasting activities for prosumer 408 as the power sensing and logging device 420 performs for prosumer 406.

The energy scheduler 402 receives requests for charging and discharging from prosumers, and processes the requests. In some embodiments, the parameters defining which requests are accepted may vary from one site to another. A number of factors in defining the parameters may include attributes associated with local market conditions and attributes associated with storage-specific parameters.

The following describes examples of local market conditions in some embodiment. In some markets, there is enough discrepancy between feed-in of solar to grid and purchase of energy from grid that this is likely to be the greatest source of marginal profit for the energy storage operator. In other markets, however, there may be additional opportunities like participating in large scale renewables shifting or frequency control. In some markets, energy storage operators may be requested to provide emergency reserves for frequency control. In that scenario, offers may exist in the form of bidding into frequency regulation markets.

The following describes examples of storage-specific parameters in one embodiment. There are many different types of energy storage: for example, pumped hydro, flywheel, chemical (e.g. Li-ion), or flow batteries. Every type of storage (even varying from one type of Li-ion to another) may have different characteristics that affect its operation and longevity. Li-ion batteries, for example, degrade faster when operated at very high or low states of charge. Therefore, it may be worthwhile for an energy storage operator to accept low-value offers when the battery is in a mid-range state-of-charge, but only to accept high-value offers when the battery is at very high or very low state-of-charge. There may be additional site-specific factors affecting how the virtual energy system is run from one location to another. In some embodiments, all of the above factors are captured by considering a general marginal cost of operation. The virtual energy system and method of the present disclosure may be relevant across all markets and chemistries.

Figure 5:
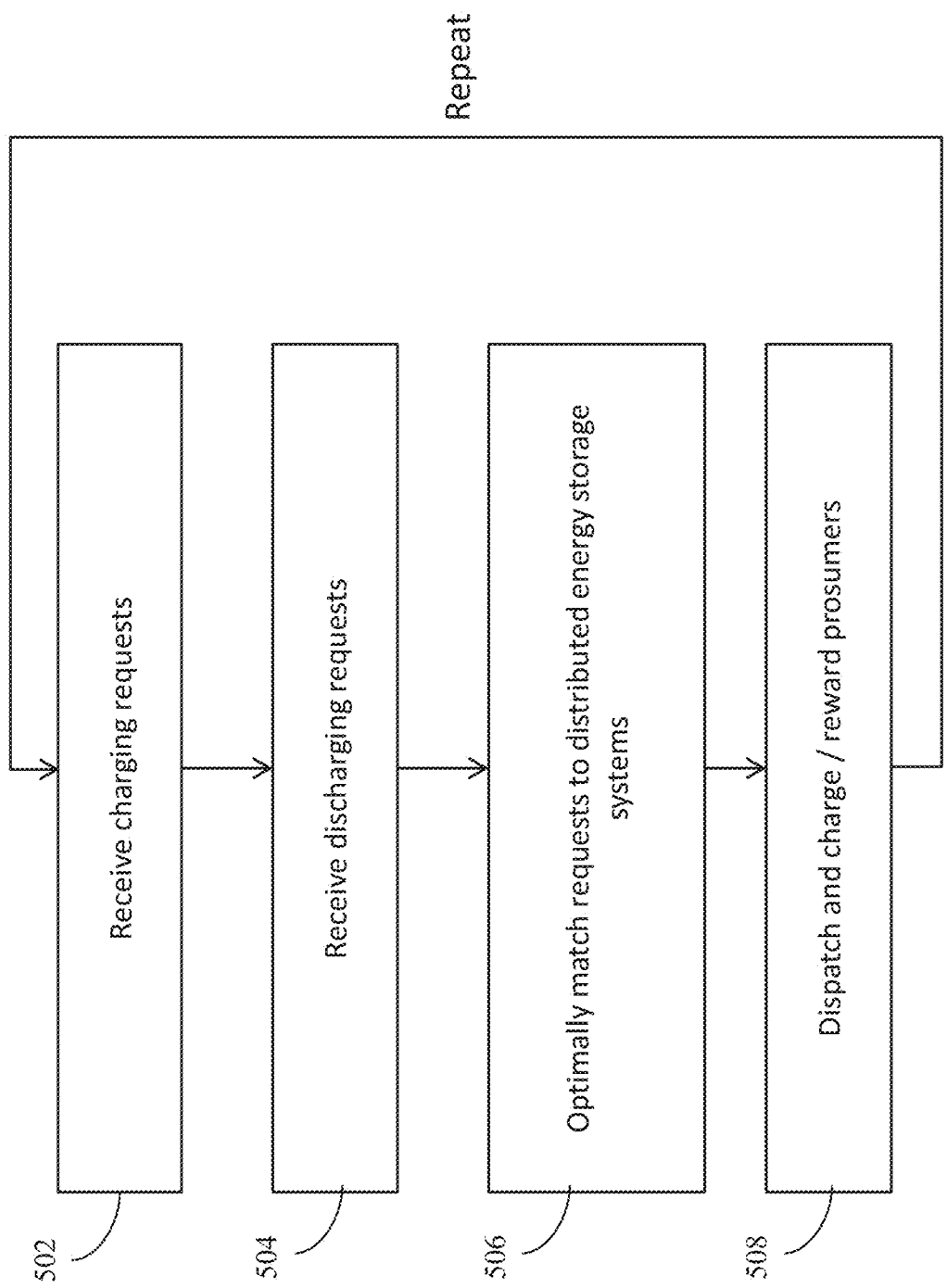
FIG. 5 is a flow diagram illustrating an overview of a method of virtualizing energy storage in one embodiment.

FIG. 5 is a flow diagram illustrating an overview of a method of virtualizing energy storage in one embodiment. The method may be executed by a hardware processor, for example, coupled with a memory device and a controller or switch that controls charging and discharging of energy from an energy storage device such as a battery. At 502, one or more charging requests are received, for example, from one or more prosumers trying to sell their energy. The requests may be received by the hardware processor, for example, via a communication network such as the Internet or via a World Wide Web employing a web application or another application. At 504, discharging requests are received, from one or more prosumers trying to buy energy. Similarly, the discharging requests may be received by the hardware processor, for example, via a communication network such as the Internet or via the World Wide Web employing a web application or another application. At 506, the hardware processor may match the discharging requests and the charging requests optimally. In one aspect, the hardware processor takes into account any physical network limitations such as one or more constraints in an optimization employed in the matching of the discharging and charging requests. The constraints (e.g., physical network limitations) to the optimization may be supplied as structured data or unstructured data. At 508, based on the optimal matching, the hardware processor triggers a switch to discharge and/or charge energy from and/or to an energy storage device, e.g., battery. The flow shown in FIG. 5 represents one time interval, and the method may repeat, for example, continuously. For instance, decisions to discharge and/or charge energy may be made repeatedly over time, for example, at specified time intervals such as at every time interval (e.g., every 5 minutes, or another configured time interval). In one aspect, the time interval of repeating the flow need not be fixed, but may vary (e.g., different time interval may be employed as the flow repeats).

Figure 6:
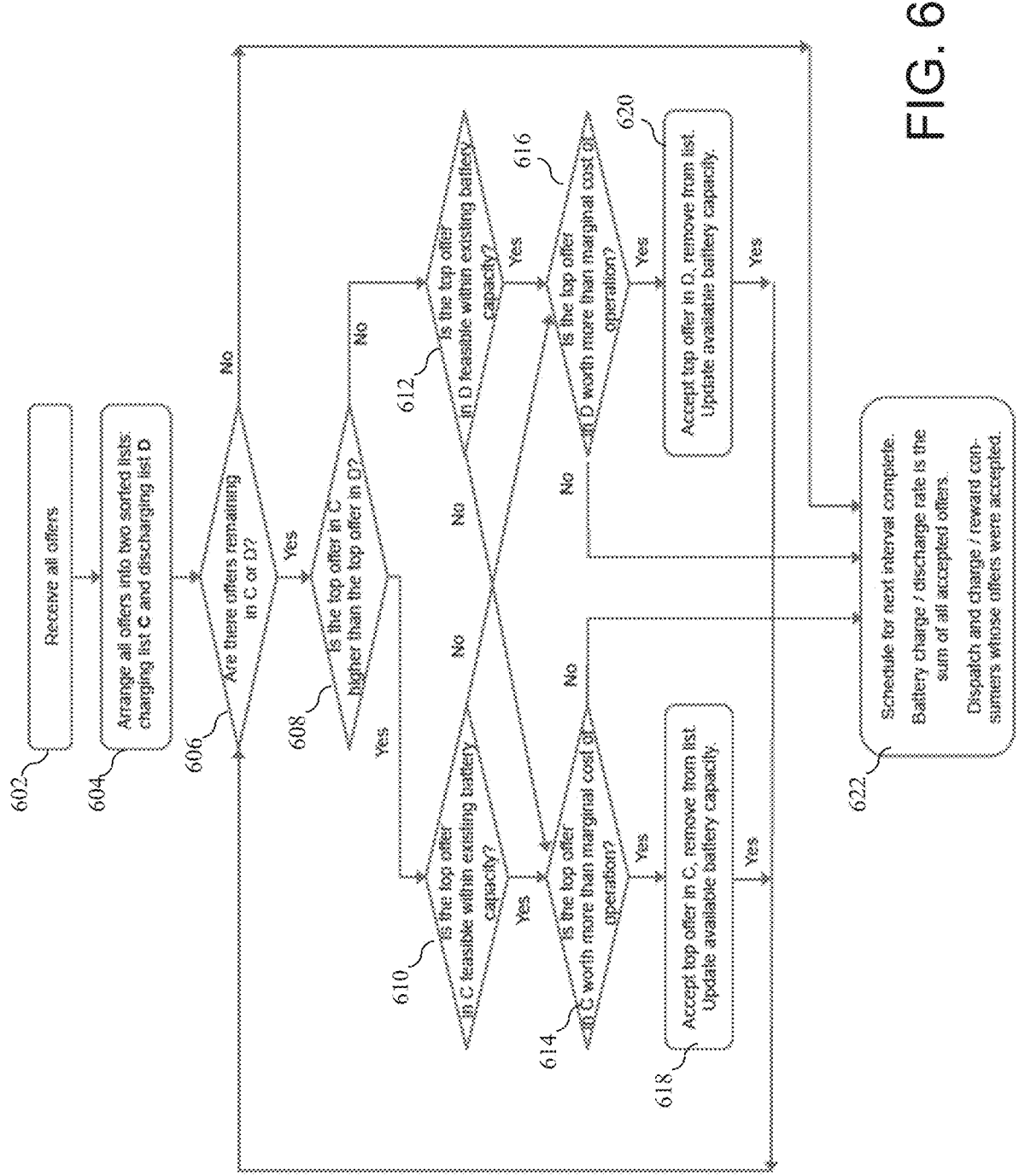
FIG. 6 is a flow diagram illustrating a method of virtualizing energy storage in more detail in one embodiment.

FIG. 6 is a flow diagram illustrating a method of virtualizing energy storage in more detail in one embodiment. The method may be executed by a hardware processor, for example, coupled with a memory device and a controller or switch that controls charging and discharging of energy from an energy storage device such as a battery. At 602, all requests (also referred to as offers) may be received, for example, by the hardware processor. The requests may be received by the hardware processor, for example, via a communication network such as the Internet or via a World Wide Web employing a web application or another application. The requests may include both charging and discharging offers. In one embodiment, each request may include two components: required charging power and offered price. Both components may be real number values, and can include negative and positive values.

An energy storage owner or operator (e.g., an entity that owns or controls the energy storage device) may know what their minimum average marginal profit needs to be per unit of energy (e.g., per kilowatt hour (kWh)), in order to offset any costs related to the energy storage device. This minimum required average marginal profit may depend on factors such as original installation cost of the energy storage device, replacement cost of the energy storage device, degradation over time of the energy storage device (which includes a potential reduction in the capacity of the energy storage device), as well as any relevant ongoing and periodic or scheduled maintenance of the energy storage device.

The energy storage owner or operator may therefore, for example, ensure that there is a minimum difference between what it pays for every unit of charging, versus what it needs to be paid for every unit of discharging. For instance, in the use case shown in FIG. 3B, the storage operator pays 15¢ for every kWh of charging, and receives 20¢ for every kWh of discharging. In that example, every kWh is worth 5¢ to the energy storage owner or operator. But if some customers offer to be paid less for charging, or are willing to pay more for discharging, then that marginal profit grows. Therefore, the value to the energy storage operator for each offer received—charging or discharging—is the additional value an offer provides beyond that of the historical average (or minimum required profit margin). This historical average may be computed based on historical profit data, and for example, may be computed as a moving average computed for a window of time, as the time advances. Minimum required profit margin may be configurable, for example, based on requirements of the energy storage owner or operator.

At 604, all offers are separated into two separate lists: one for all charging offers (C), and one for all discharging offers (D). Each list is sorted highest to lowest by additional value the offer provides, for example, by the difference of the offer from the highest price the energy storage owner or operator is willing to pay (for charging requests), and by the difference of the offer from the lowest price the energy storage owner or operator is willing to be paid (for discharging requests).

The lists are processed, for instance, the hardware processor picks, one by one, the top (most profitable) offer in either of the lists, and processes it. For example, at 606, it is determined whether there are offers remaining in list C or list D. If there is an offer remaining, the logic of the method proceeds to 608. Otherwise, the list has been exhausted, and the logic of the method proceeds to 622.

At 608, it is determined whether the top offer in list C has higher value than the top offer in list D. In one embodiment, the list with the top offer that is higher in value is processed first. For example, if the top offer in list C has higher value, then the logic of the method proceeds to 610, otherwise, the logic of the method proceeds to 612.

At 610, it is determined whether the top offer in list C (a request to charge) is feasible within existing energy storage (e.g., battery) capacity. For instance, the energy storage device ensures that it does not commit to charging itself to more than its rated capacity (e.g., cannot exceed 100% state of charge). If it is determined that the top offer in list C is feasible, the logic of the method proceeds to 614. Otherwise, the logic of the method proceeds to 616.

At 614, it is determined whether the top offer in list C has value worth more than the marginal cost of operation. As described above, the marginal cost of operation may be determined based on a plurality of factors. If the top offer in list C has value worth more than the marginal cost of operation, at 618, the top offer in list C is accepted. The entry of that top offer is removed from list C, and the available battery capacity is updated (e.g., increased by the amount offered to charge).

If at 614, it is determined that the top offer in list C does not have value worth more than the marginal cost of operation, no action is taken with respect to this top offer in list C. The logic of the method proceeds to 622. In this case, the top offer being considered at 614 is already the best available offer, charging or discharging. If it is the best offer, and it is not considered to have sufficient value, then for example none of the other offers (charging or discharging) may be considered to have sufficient value too.

If at 610, it is determined that the top offer in list C (a request to charge) is not feasible within existing battery capacity, it is determined whether the value of the top offer in list D (a request to discharge) is worth more than the marginal cost of operation at 616. If the answer at 610 is "no", then that means that the battery is likely close to fully charged. In that case, the battery should be able to discharge for almost any discharge request. There may exist exceptional scenarios in which a discharge request includes a request to discharge energy amount that is greater than the battery's full capacity. The system and/or method of the present disclosure may handle those exceptional cases individually, for example, discharging up to the amount expendable by the battery's capacity, and for example, notifying the requester of the amount discharged.

If the value of the top offer in list D is worth more than the marginal cost of operation, the top offer in list D is accepted at 620. The entry of that top offer is removed from list D, and the available battery capacity is updated (e.g., decreased by the amount requested to discharge). The logic of the method returns to 606 to process another offer entry in the lists C and/or D.

If at 616, it is determined that the value of the top offer in list D is not worth more than the marginal cost of operation, no action is taken with respect to this top offer in list D. The logic of the method proceeds to 622.

If, at 608, it is determined that the top offer in list C does not have higher value than the top offer in list D, the logic proceeds to 612. At 612, it is determined whether the top offer in list D is feasible within the existing energy storage (e.g., battery) capacity. For instance, the current available energy capacity is measured to determine whether there is enough amount of energy available to service (discharge) the requested amount of energy from this top offer from list D. If so, the logic of the method proceeds to 616.

At 616, it is determined whether the value of the top offer in list D (a request to discharge) is worth more than the marginal cost of operation. If the value of the top offer in list D is worth more than the marginal cost of operation, the top offer in list D is accepted at 620. The entry of that top offer is removed from list D, and the available battery capacity is updated (e.g., decreased by the amount requested to discharge). The logic of the method returns to 606 to process another offer entry in the lists C and/or D.

If at 616, it is determined that the value of the top offer in list D is not worth more than the marginal cost of operation, no action is taken, and the logic of the method proceeds to 622.

At 622, the hardware processor triggers or otherwise controls charging and/or discharging of the energy from the energy storage (e.g., battery) according to all accepted offers. The sum of all accepted offers, for example, provides battery charge and/or discharge rate. Cost of charging and/or discharging is dispatched to the prosumers whose offers have been accepted. For example, the accepted offers are processed by dispatching battery charge and/or discharge command, and settling any financial transaction.

The method shown in FIG. 6 may repeat or be performed iteratively, for example, periodically over time. For instance, the process may repeat every 5 minutes, or another fixed or variable time interval. The process may also be event-driven, for example, recalculating the schedule only when and as new offers arrive.

Accepting a discharge offer opens up available capacity to accept another charge offer, for example. If the top offer in one list is not feasible, and the top offer in the other list is not worth accepting, then the hardware processor considers that the limit of offers that are of value has been reached, and thus no more offers are accepted.

The system and/or method of the present disclosure in some embodiment provision the demand and supply of energy storage in an optimal way. This enables optimal scheduling of existing resources; optimal asset usage, including consideration of degradation; optimal geo-location of energy storage resources in responding to anticipated demand and in response to geo-spatial constraints). In some embodiment, the optimization includes a degree of forecasting of energy storage demand, available supply, and fluctuating price, which in turn includes a degree of weather forecasting. The system and/or method may also include a consideration of operational impact on asset degradation, and optimal trading-off of short-term benefit with long-term impact.

As described above, the energy scheduler component 402 shown in FIG. 4 may run in a cloud-based system. However, it is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
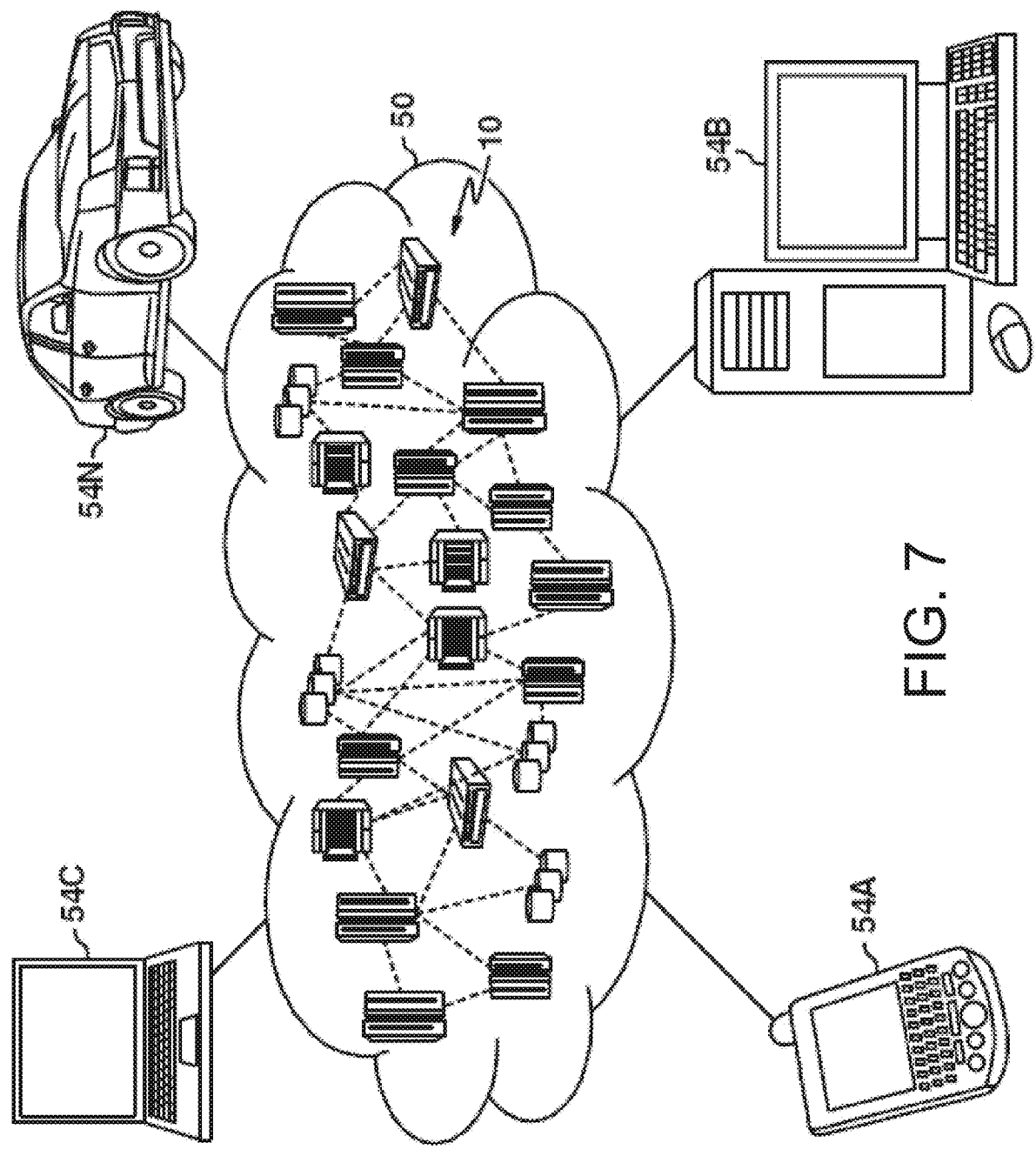
FIG. 7 illustrates a cloud computing environment in one embodiment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
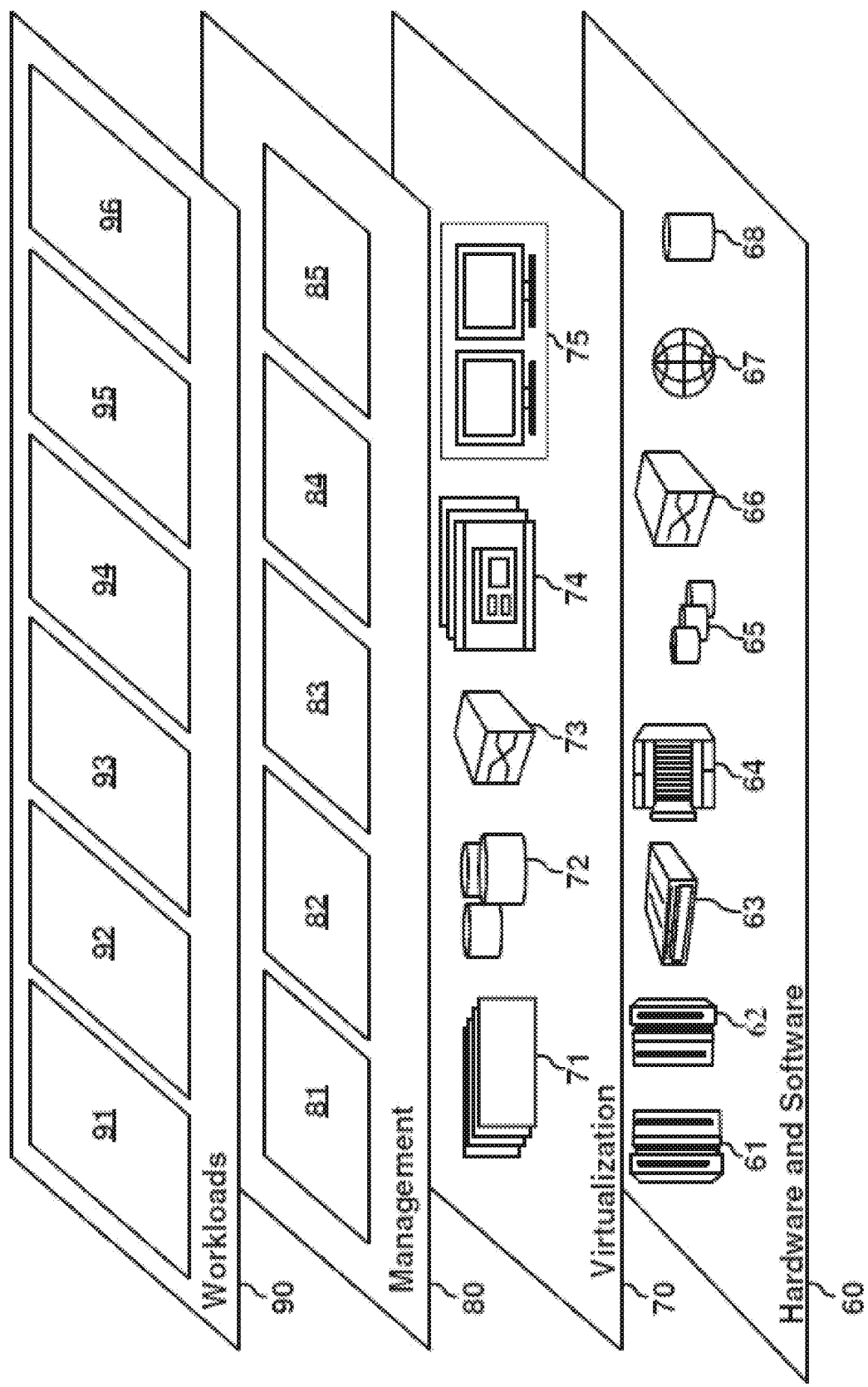
FIG. 8 illustrates a set of functional abstraction layers provided by cloud computing environment in one embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtualization of energy storage processing 96.

Figure 9:
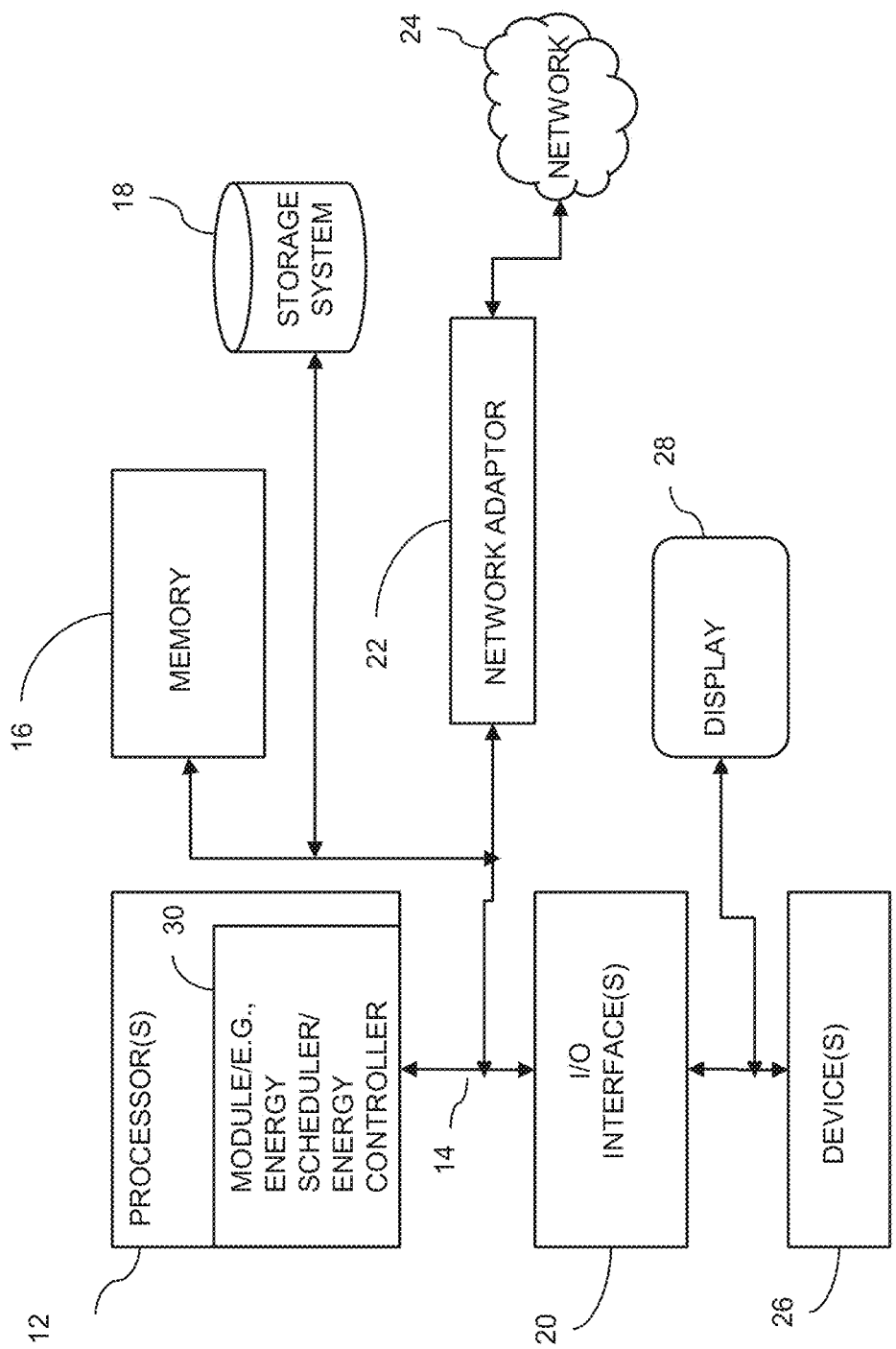
FIG. 9 illustrates a schematic of an example computer or processing system that may implement a virtual energy storage system in one embodiment of the present disclosure.

FIG. 9 illustrates a schematic of an example computer or processing system that may implement an energy storage virtualization system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. An energy storage and distribution system, comprising:
a hardware processor;
a communication interface coupled to the hardware processor and operable to connect the hardware processor to a communication network, the hardware processor operable to receive via the communication interface, charging requests and discharging requests from a plurality of prosumer facilities, the plurality of prosumer facilities including at least residential facilities of customers that both consume and produce energy; and
an energy storage coupled to an energy grid and able to charge from and discharge to the energy grid, the energy storage further coupled to the hardware processor via the communication network, the energy storage functioning as a virtual energy storage providing an on-demand common shared energy resource among the plurality of prosumer facilities for production and consumption;
based on the charging requests and discharging requests, the hardware processor operable to generate an energy schedule comprising a first set of the prosumer facilities from which to accept charge requests and store energy in the energy storage, and a second set of prosumer facilities from which to accept discharge requests, and discharge energy from the energy storage, the first set of the prosumer facilities and the second set of prosumer facilities selected from the plurality of prosumer facilities, wherein to generate the energy schedule, the hardware processor is operable to at least generate a first list including at least the charging requests, select from the first list a candidate charging request that produces profit value above a minimum profit margin, determine whether the candidate charging request is feasible to act on, and responsive to determining that the candidate charging request is feasible, add the candidate charging request to the energy schedule; and
the hardware processor further operable to control the energy storage to charge according to the energy schedule, the hardware processor further operable to receive periodically, information associated with the state of the energy storage, for controlling the energy storage in providing the virtual energy storage, the information including at least parameters related to performance characteristics, changes to useable capacity over time, and cell balancing.

2. The system of claim 1, wherein the energy storage includes at least a battery.

3. The system of claim 1, wherein the hardware processor is operable to turn on and off a switch coupled with the energy storage that connects and disconnects energy supply to and from the energy grid, to control charging and discharging.

4. The system of claim 1, wherein the energy storage includes at least a plurality of energy storages coupled to the energy grid, wherein each of the energy storages serves a respective group of prosumer facilities in the plurality of prosumer facilities, the respective group of prosumer facilities selected for said each of the energy storages based on a criterion.

5. The system of claim 1, wherein the hardware processor is operable to repeat generating of the energy schedule and controlling the energy storage at intervals of time.

6. The system of claim 1, wherein the minimum profit margin is determined based on a moving average of historical profit data in a window of time.

7. The system of claim 1, wherein the energy storage includes a battery centralized among a group of the plurality of prosumer facilities.

8. An energy storage and distribution system, comprising:
a hardware processor;
a communication interface coupled to the hardware processor and operable to connect the hardware processor to a communication network, the hardware processor operable to receive via the communication interface, charging requests and discharging requests from a plurality of prosumer facilities, the plurality of prosumer facilities including at least residential facilities of customers that both consume and produce energy; and
an energy storage coupled to an energy grid and able to charge from and discharge to the energy grid, the energy storage further coupled to the hardware processor via the communication network, the energy storage functioning as a virtual energy storage providing an on-demand common shared energy resource among the plurality of prosumer facilities for production and consumption;
based on the charging requests and discharging requests, the hardware processor operable to generate an energy schedule comprising a first set of the prosumer facilities from which to accept charge requests and store energy in the energy storage, and a second set of prosumer facilities from which to accept discharge requests, and discharge energy from the energy storage, the first set of the prosumer facilities and the second set of prosumer facilities selected from the plurality of prosumer facilities, wherein to generate the energy schedule, the hardware processor is operable to at least generate a second list including at least the discharging requests, select from the second list a candidate discharging request that produces profit value above a minimum profit margin, determine whether the candidate discharging request is feasible to act on, responsive to determining that the candidate discharging request is feasible, add the candidate discharging request to the energy schedule; and
the hardware processor further operable to control the energy storage to discharge according to the energy schedule, the hardware processor further operable to receive periodically, information associated with the state of the energy storage, for controlling the energy storage in providing the virtual energy storage, the information including at least parameters related to performance characteristics, changes to useable capacity over time, and cell balancing.

9. The system of claim 8, wherein the energy storage includes at least a battery.

10. The system of claim 9, wherein the hardware processor is operable to turn on and off a switch coupled with the energy storage that connects and disconnects energy supply to and from the energy grid, to control charging and discharging.

11. The system of claim 9, wherein the energy storage includes at least a plurality of energy storages coupled to the energy grid, wherein each of the energy storages serves a respective group of prosumer facilities in the plurality of prosumer facilities, the respective group of prosumer facilities selected for said each of the energy storages based on a criterion.

12. The system of claim 9, wherein the hardware processor is operable to repeat generating of the energy schedule and controlling the energy storage to discharge at intervals of time.

13. The system of claim 9, wherein the minimum profit margin is determined based on a moving average of historical profit data in a window of time.

14. A method of charging and discharging energy storage, the method executed by a hardware processor coupled to a communication network and an energy storage, the method comprising:
receiving via the communication network, charging requests and discharging requests from a plurality of prosumer facilities, the plurality of prosumer facilities including at least residential facilities of customers that both consume and produce energy;
based on the charging requests and discharging requests, generating an energy schedule including at least a first set of the prosumer facilities from which to accept charging requests, and a second set of prosumers from which to accept discharging requests, the first set of the prosumer facilities and the second set of prosumer facilities selected from the plurality of prosumer facilities; and
controlling the energy storage to charge and discharge according to the energy schedule, the energy storage coupled to an energy grid, the energy storage functioning as a virtual energy storage providing an on-demand common shared energy resource among the plurality of prosumer facilities for production and consumption, wherein information associated with the state of the energy storage is received periodically, for controlling the energy storage in providing the virtual energy storage, the information including at least parameters related to performance characteristics, changes to useable capacity over time, and cell balancing,
wherein the generating the energy schedule includes at least:
generating a first list including at least the charging requests;
selecting from the first list a candidate charging request that produces profit value above a minimum profit margin;
determining whether the candidate charging request is feasible to act on; and responsive to determining that the candidate charging request is feasible, adding the candidate charging request to the energy schedule.

15. The method of claim 14, wherein the energy storage includes at least a battery.

16. The method of claim 14, wherein controlling the energy storage includes at least turning on and off a switch coupled with the energy storage that connects and disconnects energy supply to and from the energy grid.

17. The method of claim 14, wherein the energy storage includes at least a plurality of energy storages coupled to the energy grid, wherein each of the energy storages serves a respective group of prosumer facilities in the plurality of prosumer facilities, the respective group of prosumer facilities selected for said each of the energy storages based on a criterion.

18. The method of claim 14, further including repeating the receiving, generating of the energy schedule and controlling the energy storage at intervals of time.

19. The method of claim 14, wherein the minimum profit margin is determined based on a moving average of historical profit data in a window of time.

\* \* \* \* \*